United States Patent [19]
Comer et al.

[11] Patent Number: 6,004,605
[45] Date of Patent: Dec. 21, 1999

[54] BONE PLASTIC CAP DEVICE AND METHOD OF USING FOR MEAT CUTS

[76] Inventors: Robert E. Comer, 1228-42nd Ave.; Glen D. Comer, 2010-46th Ave., #B-1, both of Greeley, Colo. 80634

[21] Appl. No.: 09/136,661

[22] Filed: Aug. 19, 1998

[51] Int. Cl.⁶ ..................................................... A23G 3/00
[52] U.S. Cl. .......................... 426/420; 426/124; 426/129; 206/497; 53/442
[58] Field of Search .................... 426/124, 129, 426/396, 420; 53/442, 557; 206/497

[56] References Cited

U.S. PATENT DOCUMENTS

| | | | |
|---|---|---|---|
| 3,983,258 | 9/1976 | Weaver | 426/307 |
| 4,029,822 | 6/1977 | Comer | 426/124 |
| 4,136,203 | 1/1979 | Murphy et al. | 426/124 |
| 4,136,205 | 1/1979 | Quattlebaum | 426/412 |
| 4,534,984 | 8/1985 | Kuehne | 426/412 |
| 5,039,533 | 8/1991 | Comer | 426/129 |
| 5,164,211 | 11/1992 | Comer | 426/129 |
| 5,302,402 | 4/1994 | Dudenhoeffer et al. | 426/129 |

*Primary Examiner*—David Lacey
*Assistant Examiner*—Sherry Dauerman
*Attorney, Agent, or Firm*—Emery L. Tracy

[57] ABSTRACT

A bone cap device for use over a meat cut having at least one exposed bone is provided. The meat cut is positionable inside a separate outer bag with the bone cap device cushioning the exposed bone from piercing the separate outer bag. The bone cap device comprises a first bone cap positionable over the first exposed bone. A second bone cap is positionable over the second exposed bone. A connection member connects the first bone cap to the second bone cap wherein the first bone cap and the second bone cap inhibits the first exposed bone and second exposed bone, respectively, from piercing the separate outer bag.

16 Claims, 2 Drawing Sheets

BONE PLASTIC CAP DEVICE AND METHOD OF USING FOR MEAT CUTS

BACKGROUND OF THE INVENTION

1. Field of the Invention

This invention relates generally to a bone plastic cap device for meat positioned within an outer vacuum sealed bag and, more particularly, it relates to a bone plastic cap device for meat which is positioned over exposed bone portions cushioning and inhibiting the exposed bone portions from piercing the outer vacuum sealed bag and which the bone plastic cap device also maintains its position over the exposed bone portions within the outer vacuum sealed bag.

2. Description of the Prior Art

Large cuts of meat are often processed for sale to a butcher rather than to the ultimate retail consumer. The local butcher then re-cuts the meat for display and resale to the purchasing public. In the modern-day processing of freshly killed meat, problems occur during the packaging process where vacuum sealing of the meat in an outer bag for shipping is employed.

During the butchering process, portions of exposed bone typically protrude from various places in the meat cut and may pierce the vacuum sealed outer bag producing a so-called "leaker". Since these various types of meat cuts can be quite large and can vary in shape and in the cut of meat, the problem of preserving the meat cut in an vacuum sealed outer shipping bag manifests itself whenever an exposed bone portion tears the vacuum sealed outer bag. The destruction of the vacuum seal caused by the exposed bone pieces permits entry and rapid growth of bacteria in the package, thus reducing the shelf life of the meat. The visible evidence of the bacteria growth is very apparent and can destroy the fresh appearance of the package of meat.

In order to overcome the serious bone puncture problem, the prior art solutions have attempted using separate cushions over the exposed bone portions with a cloth material impregnated with wax or other soft pliable materials thereby accomplishing a protective padding. Other cushions also have been tried using flat sheets of plastic material over the exposed bone portion. Both of the above prior art solution attempts have a distinct disadvantage of being labor intensive in application. Furthermore, the beeswax coated cushions did not permit a clear viewing of the meat underneath the padding since the beeswax coated cushions are not transparent. Additionally, separate small cushions were labor intensive to apply and difficult to keep in place over the exposed bone portions during insertion into the outer vacuum sealed bag.

For a more detailed discussion of the problems using prior art cushion devices, reference should be made to the Applicant's U.S. Pat. No. 4,029,822, issued on Jun. 14, 1977, U.S. Pat. No. 5,039,533, issued on Aug. 13, 1991, and U.S. Pat. No. 5,164,21 1, issued on Nov. 17, 1992, which are hereby incorporated herein by reference.

Accordingly, there exists a need for a bone plastic cap device for covering exposed bone portions of meat which inhibits bone piercing or punctures of the outer vacuum sealed bag. Additionally, a need exists for a bone plastic cap device for covering exposed bone portions of meat which maintains its relative position over the exposed bone portions of the meat during insertion into the outer vacuum sealed bag and during shipment of the meat. Furthermore, there exists a need for a bone plastic cap device for covering exposed bone portions of meat which expands to simultaneously cover at least two oppositely situated exposed bone portions of the meat and is maintained in relative position over the exposed bone portions.

SUMMARY OF THE INVENTION

The present invention is a bone cap device for use over a meat cut having at least one exposed bone. The meat cut is positionable inside a separate outer bag with the bone cap device cushioning the exposed bone from piercing the separate outer bag.

The bone cap device of the present invention comprises a first bone cap positionable over a first exposed bone. A second bone cap is positionable over a second exposed bone. A connection means connects the first bone cap to the second bone cap wherein the first bone cap and the second bone cap inhibiting the first exposed bone and the second exposed bone, respectively, from piercing the separate outer bag.

In an embodiment of the present invention, the first bone cap, the second bone cap, and the connection means are vacuum formed from a pliable, low-density plastic material. Preferably, the first bone cap, the second bone cap, and the connection means each have a thickness between approximately eight and one-half (8½) mils and approximately fourteen and one-half (14½) mils.

In another embodiment of the present invention, the connection means is substantially elastic thereby maintaining the relative position of the first bone cap over the first exposed bone and the relative position of the second bone cap over the second exposed bone. Preferably, the connection means comprises a pair of elastic straps extending between the first bone cap and the second bone cap with the elastic straps urging the positioned first bone cap and the positioned second bone cap toward each other. Furthermore, preferably, the elastic straps have a plurality of offset slits having a breakaway capability such that substantially all of the offset slits will break before the elastic straps will have any substantial stretching. Depending on the length of the meat cut, only a certain number of offset slits will break. Regardless, the offset slits promote stretching of the straps to position the first bone cap and the second bone cap about the meat cut.

In still another embodiment of the present invention, the bone cap device further comprises a third bone cap with the third bone cap having a size and shape approximately equal to the size and shape of the second bone cap. The third bone cap is nestingly positionable within the second bone cap with the second and third bone caps positionable over the second exposed bone and thus adding a double layer of protection at this crucial sharp location where a high concentration of force is projected by the bone of the meat cut.

In yet another embodiment of the present invention, the bone cap device further comprises a plurality of nubs formed within at least a portion of the first bone cap and within at least a portion of the second bone cap. Alternatively, the bone cap device further comprises a plurality of nubs formed within at least a portion of the first bone cap or within at least a portion of the second bone cap for adding cushioning at this bone location. Preferably, the nubs extend inward toward the first exposed bone and the second exposed bone. It is within the scope of the present invention to have the nubs extend outward away from the first exposed bone and the second exposed bone.

The present invention further includes a method for inhibiting at least one exposed bone of a meat cut from piercing or puncturing a separate outer bag. The meat cut is positionable inside the separate outer bag.

The method of the present invention comprises providing a first bone cap, providing a second bone cap, connecting the first bone cap to the second bone cap, positioning the first bone cap over the first exposed bone, and positioning the second bone cap over the second exposed bone.

In an embodiment of the present invention, the method further comprises vacuum forming the first bone cap and the second bone cap from a pliable, low-density plastic material.

In another embodiment of the present invention, the method further comprises providing elastic connection means for connecting the first bone cap to the second bone cap with the connection means maintaining the relative position of the first bone cap over the first exposed bone and the relative position of the second cap over the second exposed bone. Preferably, the method further comprises providing a pair of elastic straps extending between the first bone cap and the second bone cap with the elastic straps urging the positioned first bone cap and the positioned second bone cap toward each other. Furthermore, preferably, the method further comprises trimming a plurality of offset slits to promote breakaway and stretching of the straps to position and maintain the first bone cap and the second bone cap about the meat cut.

In still another embodiment of the present invention, the method further comprises providing a third bone cap, nestingly positioning the third bone cap within the second cap, and positioning the second and third bone caps over the second exposed bone. Alternatively, the method further comprises forming a plurality of nubs within at least a portion of the first bone cap and at least a portion of the second bone cap. Preferably, the method further comprises extending the nubs inward toward the first exposed bone and the second exposed bone. It is also within the scope of the present invention to extend the nubs outward away from the first exposed bone and the second exposed bone.

DETAILED DESCRIPTION OF THE PREFERRED EMBODIMENTS

Figure 1:
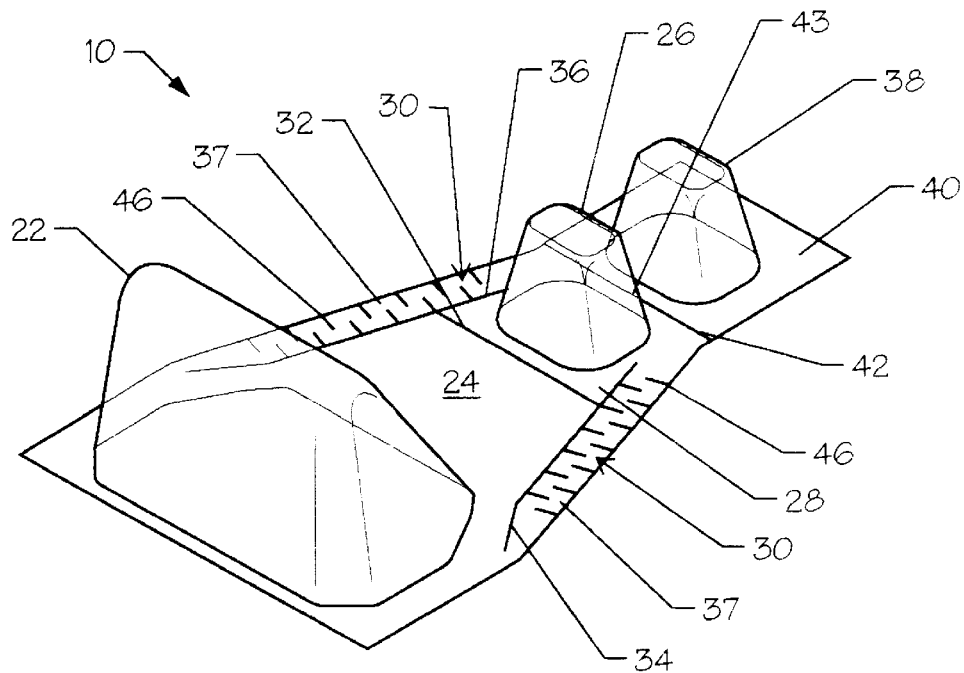
FIG. 1 is a perspective view illustrating a bone plastic cap for meat constructed in accordance with the present invention, the bone plastic cap being sized and shaped for receiving a lamb leg.
Figure 2:
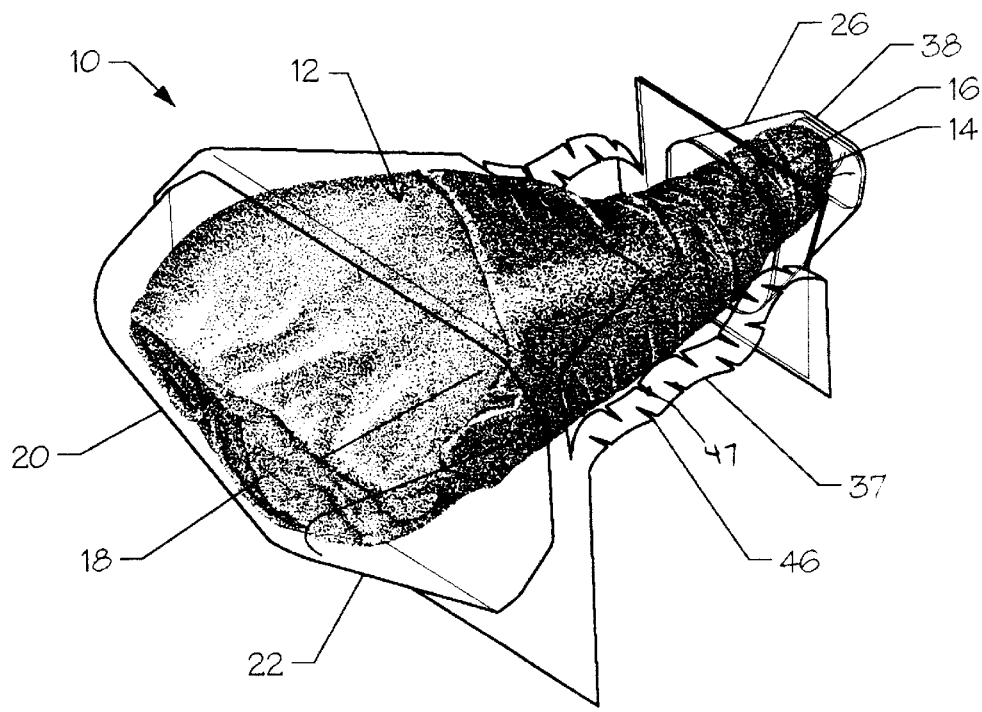
FIG. 2 is a perspective view similar to FIG. 1 illustrating the bone plastic cap for meat constructed in accordance with the present invention, the bone plastic cap receiving the lamb leg.

As illustrated in FIG. 1, the present invention is a bone plastic cap device, indicated generally at 10, for a meat cut 12 (as illustrated in FIG. 2) positioned within an outer vacuum sealed bag (not shown). Typically, as illustrated in FIG. 2, the meat cut 12 referred herein is a cut of meat of the type which is shipped to a wholesale distributor, restaurant chain, supermarket, etc., for cutting into smaller meat portions by a local butcher for retail sale. For purposes of discussion only, the meat cut 12 described herein generally has an exposed shank bone portion 14 located at the shank 16 of the meat cut 12 and an exposed upper leg bone portion 20 at the upper leg of the meat cut 12. The exposed shank bone portion 14 is a very sharp bone and special consideration is necessary to keep the bone from piercing the outer sealed bag. Other types of meat cuts having exposed bone portions (or not) or ends in different locations which can pierce the outer vacuum sealed plastic bag in which the meat cut 12 would be packaged for shipment to the wholesale distributor or supermarket are also within the scope of the present invention.

In an embodiment of the present invention, as best illustrated in FIG. 1, the bone plastic cap device 10 of the present invention has a first cap 22, a first flange or flat portion 24 about the first cap 22, a second cap 26, a second flange or flat portion 28 about the second cap 26, and a substantially elastic connection member 30 connecting the first cap 22 to the second cap 26. Preferably, the first cap 22, the first flange portion 24, the second cap 26, the second flange portion 28, and the connection member 30 are formed from a single sheet of pliable, preferably at least semitransparent plastic, i.e., an ultra low density polyethylene (ULDPE) transparent food grade plastic. The plastic sheet is vacuum molded or otherwise shaped to form the bone plastic cap device 10 of the present invention. The plastic material used to form the bone plastic cap device 10 of the present invention is approximately twelve and one-half (12½) mils but can range in thickness from approximately eight and one-half (8½) mils to approximately fourteen and one-half (14½) mils. It should be noted that constructing the bone plastic cap device 10 of the present invention from a plastic material having a thickness less than approximately eight and one-half (8½) mils and greater than approximately fourteen and one-half (14½) mils is within the scope of the present invention.

Figure 4:
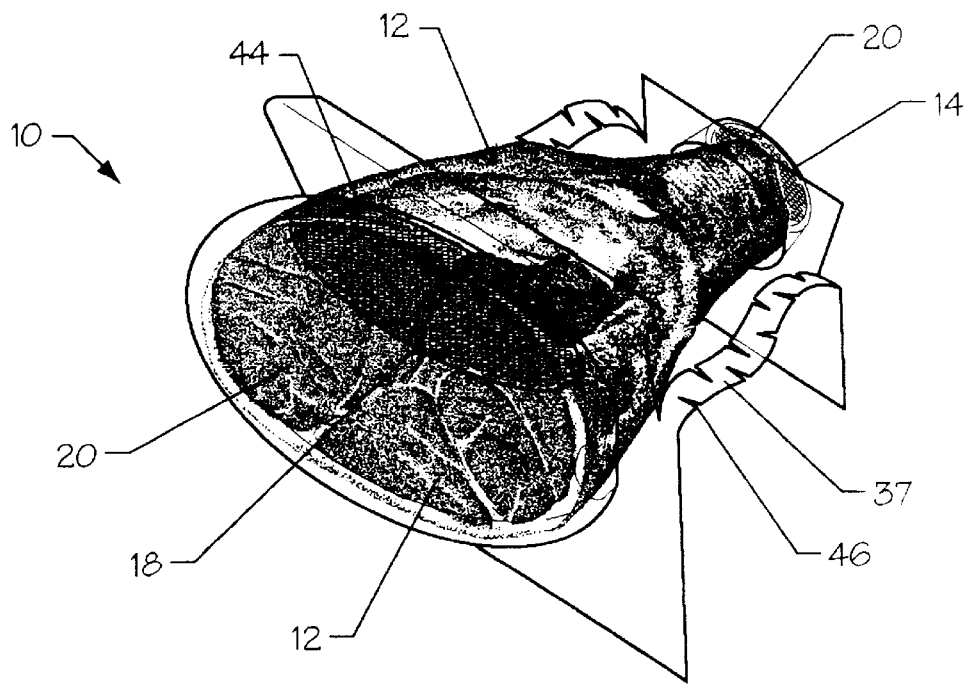
FIG. 4 is a perspective view similar to FIG. 3 illustrating the bone plastic cap for meat constructed in accordance with the present invention, the bone plastic cap receiving the ham.

A first score line 32 is trimmed between the first and second flange portions 24, 28, and a second score line 34 and a third score line 36 are trimmed between the connection member 30 and the first and second flange portions 24, 28. As illustrated in FIGS. 2 and 4, it should be noted that the second and third score lines 34, 36 extending between the connection member 30 and the first and second flange portions 24, 28 do not necessarily extend along the entire length of the connection member 30 in that the connection member 30 remains connected between the first cap 22 and the second cap.

As further illustrated in FIGS. 2 and 4, the first cap 22 is preferably sized and shaped to cover and cushion the exposed upper leg bone portion 18 of the upper leg bone 20 of the meat cut 12 and the second cap 26 is preferably sized and shaped to cover cushion the exposed shank bone portion 14 of the shank 16 of the meat cut 12. It should be noted that while the meat cut 12 illustrated in FIG. 2 is a lamb leg and the meat cut 12 illustrated in FIG. 4 is a ham, it is within the scope of the present invention to utilize the bone plastic cap device 10 of the present invention on any type of meat cut 12 including, but not limited to, beef, lamb, pork, poultry, and other as well as on other shapes all within the spirit and scope of the present invention. The meat cuts 12 illustrated in FIGS. 2 and 4 are for illustrative purposes only.

As illustrated in FIGS. 1–4, the connection member 30 of the present invention is preferably a pair of oppositely spaced, elongated substantially elastic straps 37 extending between the first cap 22 and the second cap 26. The straps 37 are defined by the second score line 34 and the third score line 36 after opening or breaking along the second score line 34 and along the third score line 36 as will be described and discussed further below.

In an embodiment of the present invention, the bone plastic cap device 10 has a third cap 38 and a third flange portion 40. A fourth score line 42 extends substantially between the second flange portion 28 and the third flange portion 40 but not entirely defining a connected portion 43 existing such that the third flange portion 40 remains connected to the second flange portion 28 even after the fourth score line 42 has been opened or broken. The third cap 38 is receivable within the second cap 26 to further inhibit the exposed shank bone portion 14 of the shank 16 from piercing the outer bag by doubling the barrier at this crucial point where there is a high concentration of force. Further discussion concerning the use and operation of the third cap 38 within the second cap 26, as well as the bone plastic cap device 10, will be described in further detail below.

In another embodiment of the present invention, the first cap 22 and the second cap 26 include a plurality of nubs 44 extending into the first cap 22 and the second cap 26 to rest against the exposed bone portions 14, 18. Preferably, the nubs 44 have a length between approximately one-eighth (⅛") inch and approximately one-quarter (¼") inch, however, nubs 44 having a length less than approximately one-eighth (⅛") inch and greater than approximately one-quarter (¼") inch are within the scope of the present invention. When positioned against the exposed bone portions 14, 18 during use of the bone plastic cap 10 within the outer bag, the nubs 44 inhibit both the exposed upper leg bone portion 18 of the upper leg 20 and the exposed shank bone portion 14 of the shank 16 from piercing the outer bag. A person skilled in the art will understand that while the nubs 44 have been described as extending into the first cap 22 and the second cap 26, it is within the scope of the present invention to have the nubs 44 extend outward from the first cap 22 and the second cap 26 away from the exposed bone portions 14, 18. Once again, actual use and operation of the bone plastic cap device 10 of the present invention with the nubs 44 on a meat cut 12 will be described in further detail below.

Figure 3:
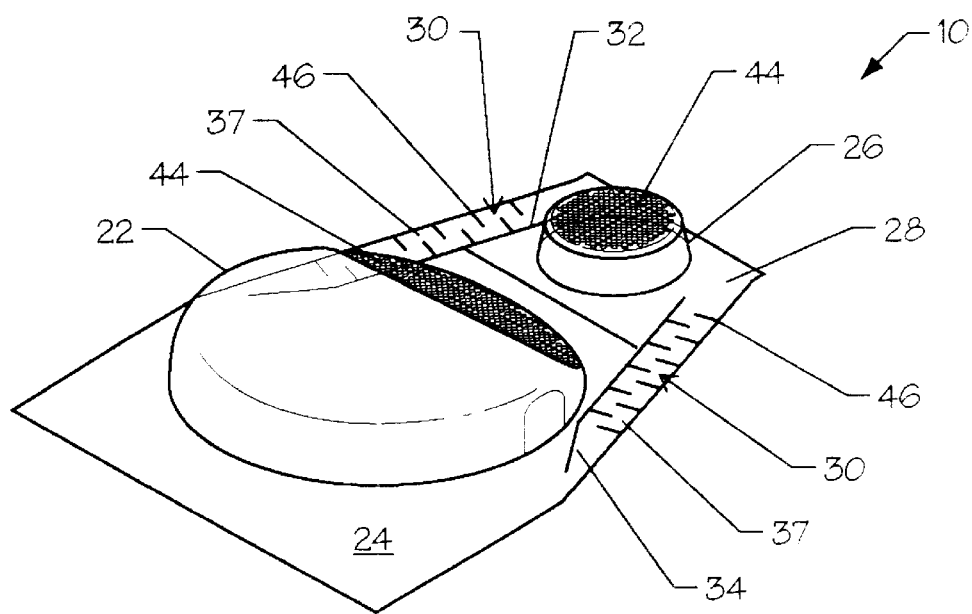
FIG. 3 is a perspective view illustrating a bone plastic cap for meat constructed in accordance with the present invention, the bone plastic cap being sized and shaped for receiving a ham.

As mentioned above, the connection member 30 extends between the first cap 22 and the second cap 26 and serves to connect the first cap 22 to the second cap 26. As illustrated in FIGS. 1 and 3, in order to accommodate larger cuts of meat that typically occur at various times of the year, the connection member 30 has a plurality of slits 46 trimmed therein with each slit 46 having a tack point 47 which preferably breaks with a minimal amount of force applied thereto. It is known that certain cuts of meat vary as much as fifteen (15%) percent over the standard size, as for example in the lamb industry where the lambs are traditionally fed more in the fall due to slower market conditions making them larger. For instance, as illustrated in FIG. 2, since lamb legs can vary in length from approximately sixteen (16") inches to approximately twenty-one (21") inches, the slits 46 of the connection member 30 can be selectively opened allowing an accordion-action stretch such that the bone plastic cap device 10 can be stretched to cover any lamb leg between sixteen (16") inches and twenty-one (21") inches and more. In fact, the slits 46 breakaway allowing the connection member 30 to resiliently stretch to greater lengths to cover and cushion larger cuts while maintaining its strength such that the bone plastic cap device 10 of the present invention can be stretched to cover and cushion a variety of meat cut sizes regardless of the occurrence of oversized conditions. Therefore, substantially all of the offset slits 46 will break before the connection member 30 will undergo any substantial stretching. Depending on the length of the meat cut 12, only a certain number of offset slits 46 will break.

The actual use and operation of the bone plastic cap device 10 of the present invention will now be described. A person skilled in the art will understand that the actual use and operation of the bone plastic cap device 10 of the present invention is not limited to the exact steps in the exact order set forth below, but will, in fact, understand that the positioning of the bone plastic cap 10 over a meat cut 12 can be achieved in a variety of ways and manners.

In operation of the bone plastic cap device 10 of the present invention, prior to the meat cut 12 being positioned within the outer sealed bag, the line personnel in the meat packing plants will ultimately position the bone plastic cap device 10 over the exposed bone portions 14, 18 of the meat cut 12 inhibiting the piercing or the puncturing of the outer sealed bag. First, however, prior to inserting the meat cut 12 into the outer sealed bag, the first cap 22 is positioned over the exposed upper leg bone portion 18 of the upper leg 20. Next, the first score line 32, the second score line 34, the third score line 36, and the fourth score line 42 are opened or broken such that the connection member 30 is the only connection between the first cap 22 and the second cap 26. Then, the third cap 38 is rotated to be nestingly received within the second cap 26. In operation, the second cap 26 encapsulates the bone portion 18 with the third cap 38 not being subject to the sharp bone portion 18 since the second cap 26 has encapsulated the bone portion 18.

By stretching the connection member 30, the tack points 47 between a certain number of the slits 46 will break allowing the slits 46 to split and the connection member 30 to stretch while at the same time allowing the connection member 30 to maintain its strength. To promote stretching, the nesting second cap 26/third cap 38 are then positioned over the exposed shank bone portion 14 of the shank 16. The elasticity of the connection member 30 maintains the relative position of the bone plastic cap device 10 over the meat cut 12. The meat cut 12 with the bone plastic cap device 10 of the present invention is then positioned by known techniques inside the outer bag which has an open end placed over an air evacuation device (not shown). The meat cut 12 then travels through a steam tunnel to accommodate bag shrinkage and then boxed. The meat cut 12 is now ready for shipment to a butcher, restaurant, grocery chain, etc.

As mentioned above, the exposed shank bone portion 14 of the meat cut 12 is a very sharp bone which makes maintaining the integrity of the outer sealed bag a challenge. As illustrated in FIGS. 1 and 2, nestingly combining the second cap 26 and third cap 38 to double cover and cushion the exposed shank bone portion 14 inhibit the sharp exposed shank bone portion 14 from piercing the sealed outer bag at this high force concentration area. Furthermore, in another embodiment, as illustrated in FIGS. 3 and 4, the nubs 44 also cover and cushion the exposed shank bone portion 14 inhibiting the sharp exposed shank bone portion 14 from piercing the sealed outer bag. When the meat cut 12 travels through the air evacuation device, the nubs 44 are caused to crush down around the exposed bone portions 14, 18 creating a padding and thereby adding body and substance to maintain the exposed bone portions 14, 18 from piercing the outer bag.

The bone plastic cap device 10 of the present invention is a vast improvement over the wax impregnated cloth of the prior art. The wax impregnated cloth sheeting does pull in tightly and protects from the piercing by the sharp bones to a degree. However, it has application and visual disadvantages as compared to the Applicants' novel invention. The wax impregnated cloth is labor intensive in application when compared to the fast and efficient capping of the exposed bone portions 14, 18 of the Applicants' invention. The visual disadvantage of the wax impregnated cloth is that the wax sheet does not possess clarity to permit viewing of the meat cut 12 beneath the wax impregnated cloth sheeting. Viewing of the meat cut 12 is important for aesthetic presentability and to determine freshness of the meat cut 12 and to determine whether spoilage or bacteria is present on the meat cut 12.

While the bone plastic cap device 10 of the present invention has been described as being sized and shaped to conform to and cover the exposed bone portions of a lamb leg and a ham, it is within the scope of the present invention to have the bone plastic cap device 10 cover different cuts of meat including, but not limited to, beef, fowl, fish, crustaceans, etc. The design of the bone plastic cap device 10 of the present invention can be customized for each standard configuration.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A bone cap device formed from a single sheet of pliable material for use over a meat cut having at least one exposed bone, the meat cut positionable inside a separate outer bag, the bone cap device cushioning the exposed bone from piercing the separate outer bag, the bone cap device comprising:

a first bone cap positionable over a first exposed bone;

a second bone cap positionable over a second exposed bone;

a connection means for connecting the first bone cap to the second bone cap;

wherein the connections means comprises a pair of elastic straps extending between the first bone cap and the second bone cap, the elastic straps urging the positioned first bone cap and the positioned second bone cap toward each other thereby maintaining the relative position of the first bone cap over the first exposed bone and the relative position of the second bone cap over the second exposed bone;

wherein the first bone cap and the second bone cap inhibiting the first exposed bone and the second exposed bone, respectively, from piercing the separate outer bag.

2. The bone cap device of claim 1 wherein the first bone cap, the second bone cap, and the connection means are vacuum formed from a pliable, linear low-density plastic material.

3. The bone cap device of claim 1 wherein the first bone cap, the second bone cap, and the connection means each have a thickness between approximately eight and one-half (8½) mils and approximately fourteen and one-half (14½) mils.

4. The bone cap device of claim 1 wherein the elastic straps have a plurality of offset slits to allow breakaway and to promote stretching of the straps to position the first bone cap and the second bone cap about the meat cut.

5. The bone cap device of claim 1 and further comprising a third bone cap, the third bone cap having a size and shape approximately equal to the size and shape of the second bone cap, the third bone cap nestingly positionable within the second bone cap, the second and third bone caps positionable over the second exposed bone.

6. The bone cap device of claim 1 and further comprising a plurality of nubs formed within at least a portion of the first bone cap and within at least a portion of the second bone cap.

7. The bone cap device of claim 1 and further comprising a plurality of nubs formed within at least a portion of the first bone cap or within at least a portion of the second bone cap.

8. The bone cap device of claim 4 wherein the nubs extend inwardly within the cap.

9. The bone cap device of claim 4 wherein the nubs extend outwardly of the cap.

10. A method for inhibiting at least one exposed bone of a meat cut from piercing or puncturing a separate outer bag, the meat cut positionable inside the separate outer bag, the method comprising:

providing a bone cap device formed from a single sheet of pliable material;

the bone cap device comprising: a first bone cap, a second bone cap, and a connection means for connecting the first bone cap to the second bone cap;

wherein the connections means comprises a pair of elastic straps extending between the first bone cap and the second bone cap, the elastic straps urging the positioned first bone cap and the positioned second bone cap toward each other thereby maintaining the relative position of the first bone cap over the first exposed bone and the relative position of the second bone cap over the second exposed bone;

positioning the first bone cap over the first exposed bone; and positioning the second bone cap over the second exposed bone.

11. The method of claim 8 and further comprising forming the bone cap device from a pliable, low density plastic material.

12. The method of claim 10 and wherein said elastic straps include a plurality of offset slits to promote breakaway and stretching of the straps to position the first bone cap and the second bone cap about the meat cut.

13. The method of claim 10 wherein the bone cap device further includes a third bone cap, the method further comprising nestingly positioning the third bone cap within the second cap and positioning the second and third bone caps over the second exposed bone.

14. The method of claim 10 and further comprising forming a plurality of nubs within at least a portion of the first bone cap and at least a portion of the second bone cap.

15. The method of claim 14 and further comprising extending the nubs inward toward the first exposed bone and the second exposed bone.

16. The method of claim 14 and further comprising extending the nubs outward away from the first exposed bone and the second exposed bone.

* * * * *